(12) United States Patent
Rahman et al.

(10) Patent No.: US 9,059,766 B2
(45) Date of Patent: Jun. 16, 2015

(54) SYSTEM AND METHOD FOR CONTROLLING CURRENT TO CERTAIN COMPONENTS OF A WIRELESS COMMUNICATION DEVICE

(75) Inventors: Mahibur Rahman, Chandler, AZ (US); Omid Oliaei, Tempe, AZ (US); Jorge Ivonnet, Chandler, AZ (US)

(73) Assignee: Intel IP Corporation, Santa Clara, CA (US)

( * ) Notice: Subject to any disclaimer, the term of this patent is extended or adjusted under 35 U.S.C. 154(b) by 330 days.

(21) Appl. No.: 13/184,180

(22) Filed: Jul. 15, 2011

(65) Prior Publication Data

US 2013/0016619 A1    Jan. 17, 2013

(51) Int. Cl.
  *H04B 1/10* (2006.01)
  *H04B 1/04* (2006.01)
  *H04B 1/00* (2006.01)

(52) U.S. Cl.
  CPC ............... *H04B 1/10* (2013.01); *H04B 1/0046* (2013.01)

(58) Field of Classification Search
  CPC ............ H04W 52/02; H04W 52/0209; H04W 52/0232; H04W 52/0245; H04B 1/10
  USPC ............. 370/278, 311, 318; 379/395.01, 395; 455/13.4, 24, 63.1, 501, 504, 522, 574
  See application file for complete search history.

(56) References Cited

U.S. PATENT DOCUMENTS

| | | | |
|---|---|---|---|
| 5,742,246 A | 4/1998 | Kuo et al. | 341/143 |
| 6,573,947 B1 * | 6/2003 | Oh | 348/607 |
| 7,525,465 B1 | 4/2009 | Elwan et al. | 341/143 |
| 7,800,524 B2 | 9/2010 | Lee et al. | 341/143 |
| 7,817,713 B1 * | 10/2010 | Anvari | 375/232 |
| 7,825,841 B2 | 11/2010 | Sundström et al. | 341/143 |
| 2005/0075873 A1 * | 4/2005 | Makinen | 704/230 |
| 2006/0030286 A1 * | 2/2006 | Haub et al. | 455/295 |
| 2006/0079191 A1 * | 4/2006 | Parssinen et al. | 455/226.1 |
| 2007/0064839 A1 * | 3/2007 | Luu | 375/340 |
| 2007/0293180 A1 * | 12/2007 | Rahman et al. | 455/296 |
| 2008/0056413 A1 * | 3/2008 | Demir et al. | 375/345 |
| 2008/0117087 A1 * | 5/2008 | Van Veldhoven | 341/139 |

* cited by examiner

*Primary Examiner* — Un C Cho
*Assistant Examiner* — Jeremy Costin
(74) *Attorney, Agent, or Firm* — Baker Botts L.L.P.

(57) ABSTRACT

A method may include: determining a signal strength of a signal in a receive path of a wireless communication element, the receive path configured to receive a wireless communication signal and convert the wireless communication signal into a digital signal based at least on an oscillator signal; selecting a current mode from at least one of a first current mode and a second current mode for the wireless communication element based at least on the signal strength; communicating a control signal to the receive path indicative of the current mode; modifying one or more operational parameters of the receive path such that the receive path consumes a different amount of current in each of the current modes.

16 Claims, 4 Drawing Sheets

SYSTEM AND METHOD FOR CONTROLLING CURRENT TO CERTAIN COMPONENTS OF A WIRELESS COMMUNICATION DEVICE

TECHNICAL FIELD

The present disclosure relates generally to wireless communication and, more particularly, to controlling current to certain components of wireless communication devices.

BACKGROUND

Wireless communications systems are used in a variety of telecommunications systems, television, radio and other media systems, data communication networks, and other systems to convey information between remote points using wireless transmitters and wireless receivers. A transmitter is an electronic device which, usually with the aid of an antenna, propagates an electromagnetic signal such as radio, television, or other telecommunications. Transmitters often include signal amplifiers which receive a radio-frequency or other signal, amplify the signal by a predetermined gain, and communicate the amplified signal. On the other hand, a receiver is an electronic device which, also usually with the aid of an antenna, receives and processes a wireless electromagnetic signal. In certain instances, a transmitter and receiver may be combined into a single device called a transceiver.

In many instances, wireless communication devices are configured such that they assume receipt of signals at a particular signal strength and are configured accordingly to process signals at such signal strength. However, in order to process signals at such signal strength, operation of a wireless communication device may in fact require consumption of significant amounts of power, thus reducing battery life or requiring frequent recharging of batteries providing electrical energy to the wireless communication device.

SUMMARY

In accordance with some embodiments of the present disclosure, a method may include determining a signal strength of a signal in a receive path of a wireless communication element, the receive path configured to receive a wireless communication signal and convert the wireless communication signal into a digital signal based at least on an alternating current oscillator signal. The method may also comprise selecting a current mode from at least one of a first current mode and a second current mode (e.g., a high current mode of operation or a low current mode of operation) for the wireless communication element based at least on the signal strength. The method may additionally include communicating a control signal to the receive path indicative of the current mode. The method may further include modifying one or more operational parameters of the receive path such that the receive path consumes a lower amount of current than it does in the first current mode in response to a switch from the first current mode to the second current mode as indicated by the control signal. The method may also include modifying one or more operational parameters of the receive path such that the receive path consumes a higher amount of current than it does in the second current mode in response to a switch from the second current mode to the first current mode as indicated by the control signal.

Technical advantages of one or more embodiments of the present disclosure may include operation of a wireless communication device in multiple current modes based on a determination of signal strength in a receive path, thus permitting a wireless communication device to, from time to time, enter a lower current mode that may reduce the necessity to recharge a battery supplying electrical energy to the wireless communication device.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
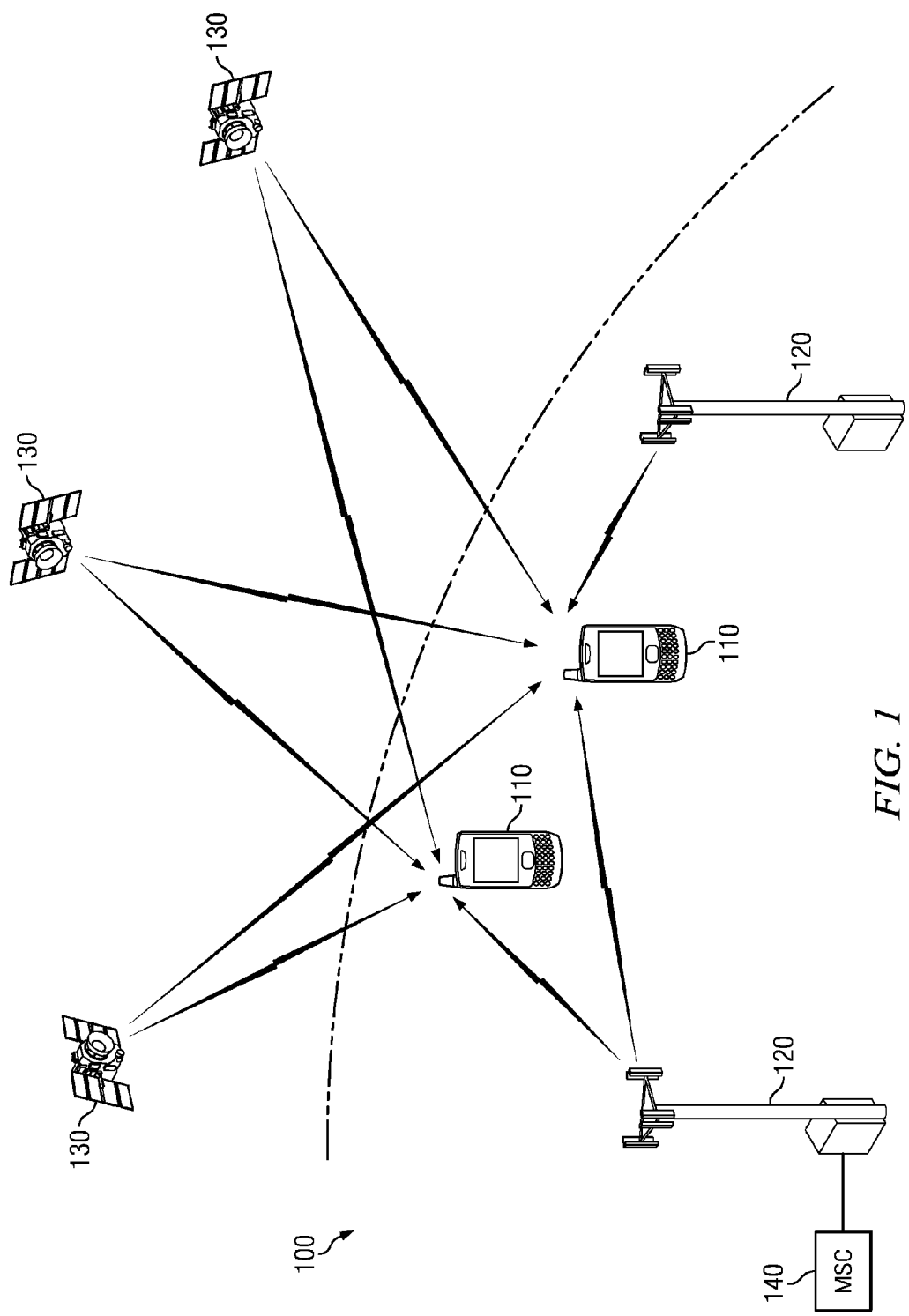
FIG. 1 illustrates a block diagram of an example wireless communication system, in accordance with embodiments of the present disclosure.

FIG. 1 illustrates a block diagram of an example wireless communication system 100, in accordance with certain embodiments of the present disclosure. For simplicity, only two terminals 110 and two base stations 120 are shown in FIG. 1. A terminal 110 may also be referred to as a remote station, a mobile station, an access terminal, user equipment (UE), a wireless communication device, a cellular phone, or some other terminology. A base station 120 may be a fixed station and may also be referred to as an access point, a Node B, or some other terminology. A mobile switching center (MSC) 140 may be coupled to the base stations 120 and may provide coordination and control for base stations 120.

A terminal 110 may or may not be capable of receiving signals from satellites 130. Satellites 130 may belong to a satellite positioning system such as the well-known Global Positioning System (GPS). Each GPS satellite may transmit a GPS signal encoded with information that allows GPS receivers on earth to measure the time of arrival of the GPS signal. Measurements for a sufficient number of GPS satellites may be used to accurately estimate a three-dimensional position of a GPS receiver. A terminal 110 may also be capable of receiving signals from other types of transmitting sources such as a Bluetooth transmitter, a Wireless Fidelity (Wi-Fi) transmitter, a wireless local area network (WLAN) transmitter, an IEEE 802.11 transmitter, and any other suitable transmitter.

In FIG. 1, each terminal 110 is shown as receiving signals from multiple transmitting sources simultaneously, where a transmitting source may be a base station 120 or a satellite 130. In certain embodiments, a terminal 110 may also be a transmitting source. In general, a terminal 110 may receive signals from zero, one, or multiple transmitting sources at any given moment.

System 100 may be a Code Division Multiple Access (CDMA) system, a Time Division Multiple Access (TDMA) system, or some other wireless communication system. A CDMA system may implement one or more CDMA standards such as IS-95, IS-2000 (also commonly known as "1x"), IS-856 (also commonly known as "1xEV-DO"), Wideband-CDMA (W-CDMA), and so on. A TDMA system may implement one or more TDMA standards such as Global System for Mobile Communications (GSM). The W-CDMA standard is defined by a consortium known as 3GPP, and the IS-2000 and IS-856 standards are defined by a consortium known as 3GPP2.

Figure 2:
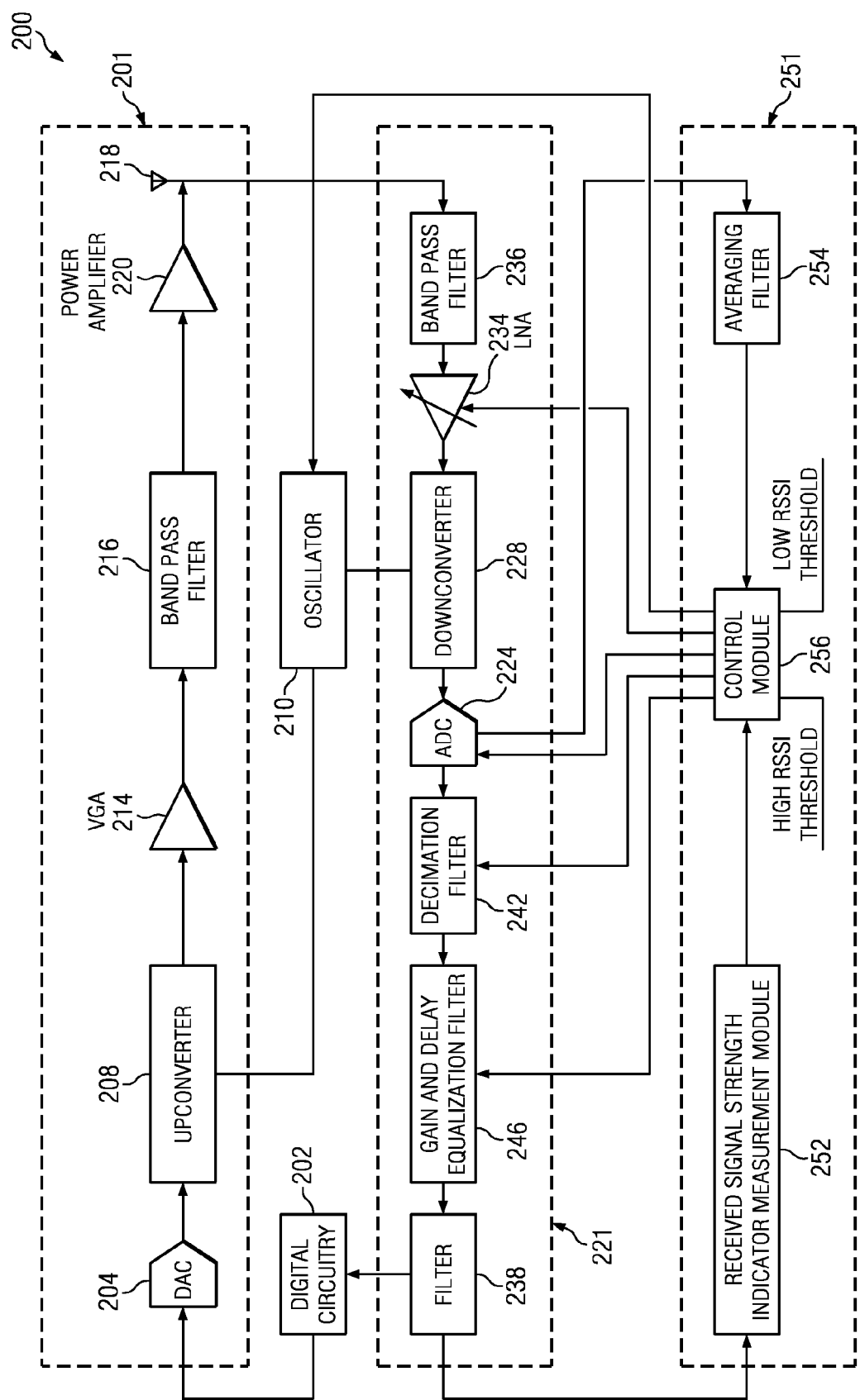
FIG. 2 illustrates a block diagram of selected components of an example transmitting and/or receiving element, in accordance with embodiments of the present disclosure.

FIG. 2 illustrates a block diagram of selected components of an example transmitting and/or receiving element 200 (e.g., a terminal 110, a base station 120, or a satellite 130), in accordance with certain embodiments of the present disclosure. Element 200 may include a transmit path 201, receive path 221, and/or a control path 251. Depending on the functionality of element 200, element 200 may be considered a transmitter, a receiver, or a transceiver. In addition, in certain embodiments transmit path 201 may be considered a transmitter, while receiver path 221 may be considered a receiver.

As depicted in FIG. 2, element 200 may include digital circuitry 202. Digital circuitry 202 may include any system, device, or apparatus configured to process digital signals and information received via receive path 221, and/or configured to process signals and information for transmission via transmit path 201. Such digital circuitry 202 may include one or more microprocessors, digital signal processors, and/or other suitable devices.

Transmit path 201 may include a digital-to-analog converter (DAC) 204. DAC 204 may be configured to receive a digital signal from digital circuitry 202 and convert such digital signal into an analog signal. Such analog signal may then be passed to one or more other components of transmit path 201, including upconverter 208.

Upconverter 208 may be configured to frequency upconvert an analog signal received from DAC 204 to a wireless communication signal at a radio frequency based on an oscillator signal provided by oscillator 210. Oscillator 210 may be any suitable device, system, or apparatus configured to produce an analog waveform of a particular frequency for modulation or upconversion of an analog signal to a wireless communication signal, or for demodulation or downconversion of a wireless communication signal to an analog signal. In some embodiments, oscillator 210 may be a digitally-controlled crystal oscillator. In these and other embodiments, oscillator 210 may be controlled by control module 256 of control path 251, as described in greater detail below.

Transmit path 201 may include a variable-gain amplifier (VGA) 214 to amplify an upconverted signal for transmission, and a bandpass filter 216 configured to receive an amplified signal VGA 214 and pass signal components in the band of interest and remove out-of-band noise and undesired signals. The bandpass filtered signal may be received by power amplifier 220 where it is amplified for transmission via antenna 218. Antenna 218 may receive the amplified signal and transmit such signal (e.g., to one or more of a terminal 110, a base station 120, and/or a satellite 130).

Receive path 221 may include a bandpass filter 236 configured to receive a wireless communication signal (e.g., from a terminal 110, a base station 120, and/or a satellite 130) via antenna 218. Bandpass filter 236 may pass signal components in the band of interest and remove out-of-band noise and undesired signals. In addition, receive path 221 may include a low-noise amplifier (LNA) 234 to amplify a signal received from bandpass filter 236. As shown in FIG. 2, LNA 234 may be configured with a variable gain, controlled by control module 256 of control path 251, as described in greater detail below.

Receive path 221 may also include a downconverter 228. Downconverter 228 may be configured to frequency downconvert a wireless communication signal received via antenna 218 and amplified by LNA 234 by an oscillator signal provided by oscillator 210 (e.g., downconvert to a baseband signal). In addition, downconverter 228 may be configured to output a current-mode analog signal as the downconverted signal.

Receive path 221 may further include an analog-to-digital converter (ADC) 224 configured to receive the current-mode analog signal from downconverter 228 and convert such analog signal into a digital signal. ADC 224 is discussed in greater detail below with respect to FIG. 3.

Figure 3:
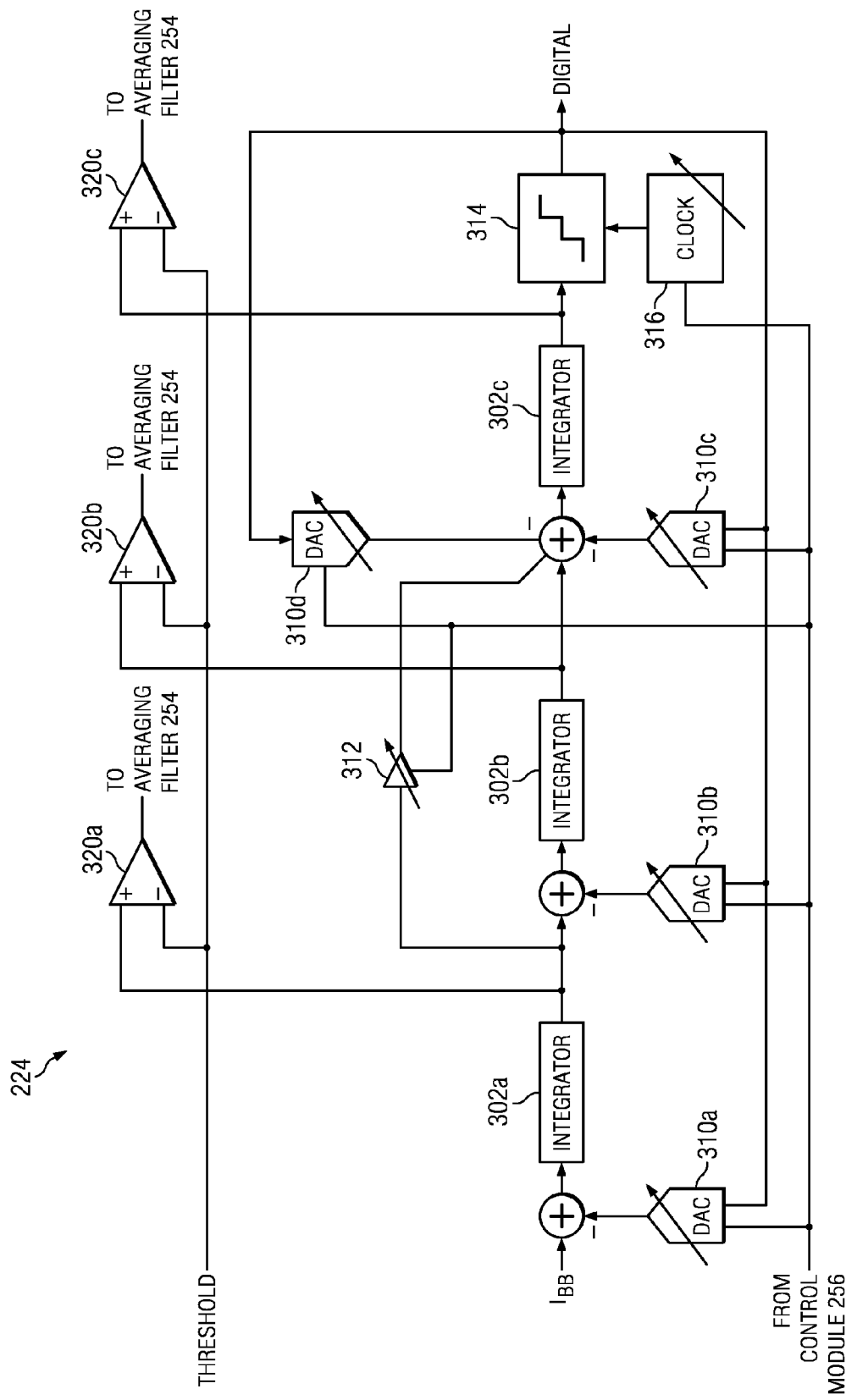
FIG. 3 illustrates a block diagram of an example analog-to-digital converter, in accordance with embodiments of the present disclosure.

FIG. 3 illustrates a block diagram of an example analog-to-digital converter 224, in accordance with certain embodiments of the present disclosure. As shown in FIG. 3, ADC 224 may include one or more integrators 302, one or more digital-to-analog converters 310, a gain element 312, a quantizer 314, and one or more threshold detectors 320.

An integrator 302 may be any system, device, or apparatus configured to integrate, with respect to time, a signal received at its input. In certain embodiments, an integrator 302 may have a current-mode output. As shown in FIG. 3, integrators 302 may be arranged in a cascade configuration, such that the output signal from some of integrators 302 may be communicated to a subsequent integrator 302 in the cascade configuration. In FIG. 3, ADC 224 includes three integrators 302, meaning that the embodiment of FIG. 3 is implemented as a third-order delta-sigma modulator. It is understood that ADC 224 may be implemented in any suitable nth-order delta-sigma modulator (in which n is any suitable positive integer number), and thus include any suitable number of integrators 302.

Quantizer 314 may be any system, device, or apparatus configured to receive an analog signal (e.g., an analog voltage signal in the embodiment depicted in FIG. 3) and convert such analog signal to an x-bit digital signal (in which x is any suitable positive integer number). Such digital signal may be output by ADC 224 to decimation filter 242. A sampling rate of quantizer 314 (and accordingly, the sampling rate of ADC 224) may be established by a clock 316 synchronizing the conversion of analog to x-bit digital signals.

The output signal of quantizer 314 may also be fed back to the inputs of one or more of the integrators 302. For example, as shown in FIG. 3, the digital output signal of quantizer 314 may be communicated to one or more DACs 310. A DAC 310 may be configured to receive the digital signal from quantizer 314 and convert such digital signal into an analog current signal. A DAC 310 may also be configured to communicate such current signal to an input of an integrator 302, such that the DAC 310 output current signal is summed with other current signals communicated to the input of the integrator 302. To illustrate, the output current signal of DAC 310a may be summed with $I_{BB}$, the input current to ADC 224, and input to integrator 302a. Similarly, the output current signal of DAC 310b may be summed with the current output of integrator 302a and input to integrator 302b. Also, the output current signals of DAC 310c and 310d may be summed together and with the current output of integrator 302b and input to integrator 302c. Each DAC 310 may be weighted in accordance with a multiplicative coefficient, such that the input digital signal of a particular DAC is scaled by its associated coefficient to produce its output analog signal. As shown in FIG. 3, such coefficients may be variable and controlled by a signal received from control module 256 of control path 251, as described in greater detail below.

In some embodiments, DACs 310 providing feedback to the last integrator 302 stage of an ADC 224 may be configured to provide for delay compensation for delays introduced by quantizer 314 or other components of ADC 224. Accordingly, in such embodiments, such DACs 310 (e.g., DACs 310c and 310d of FIG. 3) may delay their output by a certain duration from its input. In these and other embodiments, the individual delays of such DACs 310 may be different. In addition, in certain embodiments (e.g., those in which delay compensation is not a concern), only one DAC 310 will provide feedback to the last integrator 302 stage.

In some embodiments of ADC 224, ADC 224 may include a feedforward path. Based on the gain of a gain element 312 of such feedforward path, the signal transfer function (STF) of ADC 224 may include a transmission zero at a particular frequency (e.g., at a frequency of a blocker). In such embodiments, the transmission zero may be set at a frequency corresponding to an undesired out-of-band signal. In certain embodiments, gain of gain element 312 (and thus the gain of the feedforward path) may be variable, allowing for tuning of the frequency at which the transmission zero will occur. In these and other embodiments, gain of gain element 312 may be controlled by a signal received from control module 256 of control path 251, as described in greater detail below.

Each threshold detector 320 may be coupled to a corresponding integrator 302 output, and may compare its corresponding integrator 302 output to a threshold signal (e.g., voltage) to determine if the integrator output signal exceeds the threshold. An occurrence of an integrator output signal exceeding the threshold may indicate clipping of integrator output signals due to, for example, large input signals to integrators 302. Each threshold detector 320 may output a one-bit digital output signal indicative of whether its corresponding integrator output signal exceeds the threshold. The output of each threshold detector 320 may be communicated to averaging filter 254 of control path 251. In some embodiments, each threshold detector 320 may be implemented as a comparator, as shown in FIG. 3. Although FIG. 3 depicts threshold detectors 320 each having a similar or identical threshold for comparison, in some embodiments, the threshold for each threshold detector 320 may be set independently.

Returning to FIG. 2, receive path 221 may also include decimation filter 242. Decimation filter 242 may include any system, device, or apparatus configured to perform decimation (e.g., low-pass anti-aliasing filtering and/or downsampling) of a digital signal received at its input. Decimation filter 242 may perform low-pass anti-aliasing in order to restrict bandwidth of a received signal in order to satisfy the sampling theorem when the signal is downsampled by decimation filter 242. Decimation filter 242 may also downsample (e.g., reduce the rate of sampling) of a received digital signal (e.g. downsample from the sample rate of ADC 224 to a lower rate for processing by digital circuitry 202). A difference in sampling rate of ADC 224 (e.g., as set by clock 316) and sampling rate of decimation filter 242 may be referred to as a downsampling ratio. As shown in FIG. 2, decimation filter 242 may be controlled by control module 256 of control path 251, as set forth in greater detail below.

Receive path 221 may also include a gain and delay equalization filter 246. As is explained in greater detail below, based on control signals communicated by control module 256 of control path 251 to other components of receive path 221, various operating parameters of such components (e.g., bias currents, gain coefficients, etc.) may be varied in order to reduce operating current of wireless communication device 200. However, when such parameters are modified, the overall signal gain and/or signal delay of a signal through receive path 221 may vary. Accordingly, gain and delay equalization filter 246 may be any system, device, or apparatus configured to, based on a received control signal, apply a specific gain and/or a specific delay to a signal received at its input and output the result to its output. For example, as explained below, in certain embodiments receive path 221 may be operated in either a low-current mode or a high-current mode. A control signal received by gain and delay equalization filter 246 from control module 256 may indicate whether operation is in the low-current mode or the high-current mode. Based on such signal, gain and delay equalization filter 246 may apply appropriate gain and/or delay parameters to an input signal to produce an output signal conditioned to the present current mode. In certain embodiments, gain and/or delay parameters applied by gain and delay equalization filter 246 may be predetermined based on characterization and/or testing of the performance of wireless communication device 200.

Receive path 221 may further include a filter 238. Filter 238 may include any system, device, or apparatus further configured to filter received by filter 238 from the output of gain and delay equalization filter 246 in order to pass the signal components within a radio-frequency channel of interest and/or to remove noise and undesired signals that may be generated within components of receive path 221. Such filtered digital signal may then be passed to digital circuitry 202 for processing.

Although transmit path 201 and receive path 221 have depicted only one signal path for exposition and clarity, it is noted that one or more components of transmit path 201 and/or receive path 221 may be duplicated such that functionality of such components may be applied to each of an in phase channel and a quadrature phase channel of a signal, as is known in the art.

Control path may include a received signal strength indicator (RSSI) measurement module 252, an averaging filter 254, and a control module 256. RSSI measurement module 252 may include any system, device, or apparatus configured to measure approximate signal strength of a signal in receive path 221 (e.g., a signal output by filter 238). For example, based on the in phase channel and quadrature channel components of the output signal of filter 238, RSSI measurement module 252 calculate and output signals indicative of the magnitude of the power |P| of the output signal of filter 238. For instance, RSSI measurement module 238 may calculate signal strength, as indicated by power, in accordance with the equation $P=(I^2+Q^2)$, where I is the power of the I channel component and Q is the power of the Q channel component. Alternatively, RSSI measurement module 238 may calculate signal strength, as indicated by magnitude, in accordance with the equation $|P|=\sqrt{(I^2+Q^2)}$, where I is the power of the I channel component and Q is the power of the Q channel component. Other methods to compute a RSSI measurement may also be utilized.

Averaging filter 254 may include any system, device, or apparatus to average one or more received inputs to produce one or more output signals indicative of an average of the received inputs. Specifically, as shown in FIGS. 2 and 3, averaging filter may individually or aggregately average the various outputs of threshold detectors 320 of ADC 224. Such averaging may have the effect of filtering out outlier values received from threshold detectors 320.

Control module 256 may include any system, device, or apparatus configured to, based on signals received from RSSI measurement module 252 and/or averaging filter 254, output a control signal to one or more components of wireless communication module 200 indicative of a current mode. For example, if control module 256 determines based on a signal received from RSSI measurement module 252 that a signal strength in receive path 221 is above a first specific threshold (e.g., HIGH RSSI THRESHOLD depicted in FIG. 2), and/or determines based on a signal received from averaging filter that clipping within ADC 224 is not occurring, control module 256 may output a signal indicating that wireless communication device 200 is to operate in a low-current mode. On the other hand, if control module 256 determines based on a signal received from RSSI measurement module 252 that a signal strength in receive path 221 is below a second specific threshold (e.g., LOW RSSI THRESHOLD depicted in FIG. 2), and/or determines based on a signal received from averaging filter that clipping within ADC 224 is occurring, control module 256 may output a signal indicating that wireless communication device 200 is to operate in a high-current mode. In some embodiments, the first threshold and the second threshold may be approximately the same value. In other embodiments, the first threshold may be significantly greater than the second threshold so as to create hysteresis with respect to the switching between the low-current mode and the high-current mode, in order to prevent frequent switching between the two modes as a result of small changes in signal strength.

As a result of receiving a signal from control module 256 indicating a switch from a high-current state to a low-current state, one or more components of wireless communication device 200 may modify one or more operational parameters such that such components consume a lower amount of current than they do in the high-current state. In addition, as a result of receiving a signal from control module 256 indicating a switch from a high-current state to a low-current state, one or more other components of wireless communication device 200 may modify one or more operational parameters to account for modified delays, modified gains, and/or other modified performance of components of wireless communication device 200 on account of switching to the low-current mode. For example, in response to a change between the high-current mode and the low-current mode:

LNA 234 or other gain elements of wireless communication device 200 may reduce their bias currents;

oscillator 210 may reduce its drive levels or drive levels of its clock generation buffers;

ADC 224 may reduce its sampling rate (e.g., as set by clock 316) and modify coefficients of its feedback elements (e.g., DACs 310) and/or gain elements (e.g., gain element 312) to reflect a desired signal and noise transfer function at the lower sampling rate, without changing its topology and/or order;

decimation filter 242 may reduce its sampling rate to that of ADC 224 while also changing its operational parameters (e.g., decimation filter coefficients) to decimate its received input signal by a reduced downsampling ratio as compared to the downsampling ratio applied during the high-current mode; and/or gain and delay equalization filter 246 may modify its operational parameters to compensate for any gain and/or delay differences present in the low-current mode as compared to the high-current mode, thus ensuring gain and phase continuity of the signal received by digital circuitry 202.

In the event of a change from a low-current mode to a high-current mode, one or more components of wireless communication module 200 may modify operational parameters in a manner inverse to that described above.

Figure 4:
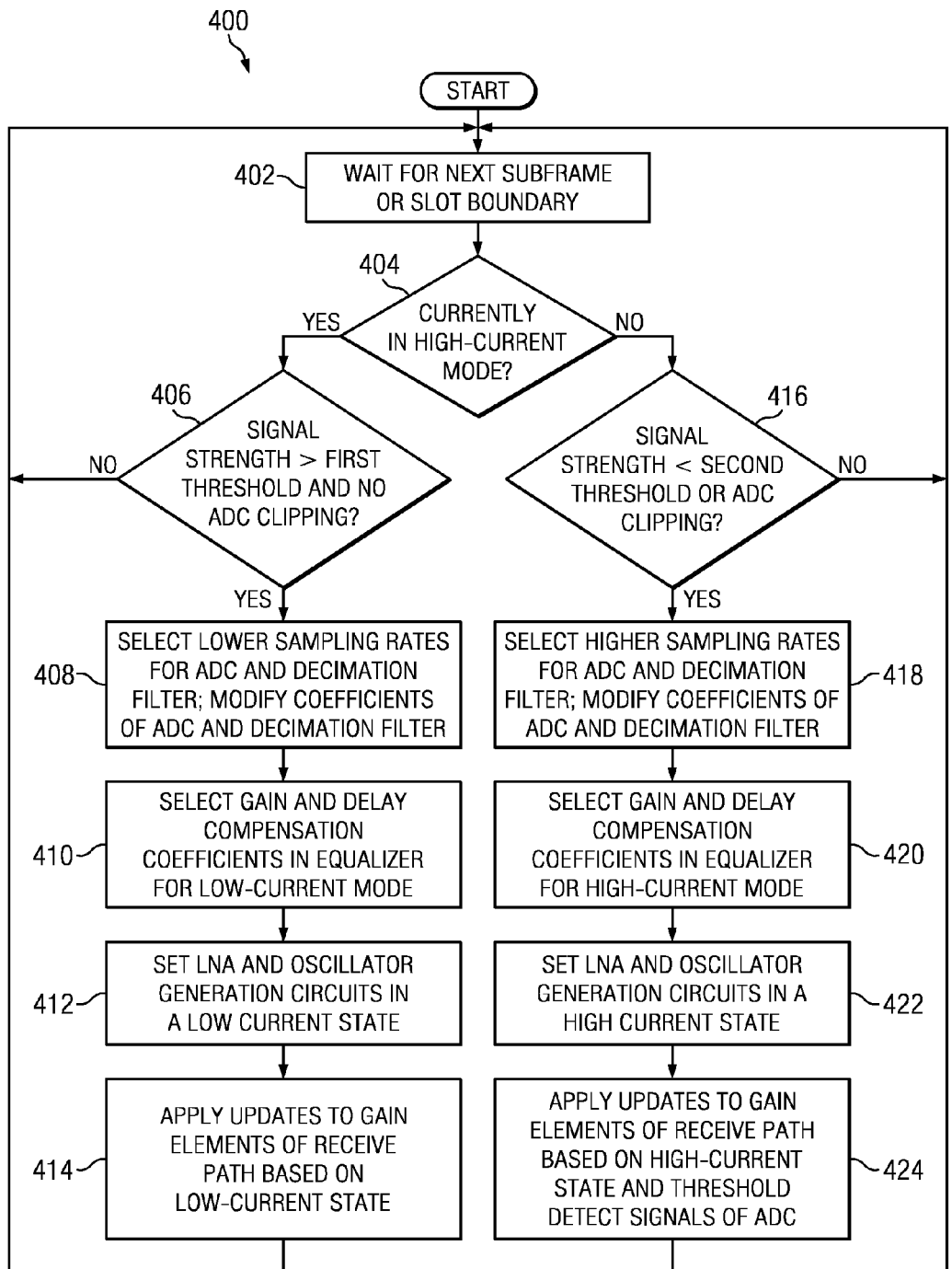
FIG. 4 illustrates a flow chart of an example method for controlling current to certain components of a wireless communication device, in accordance with embodiments of the present disclosure.

FIG. 4 illustrates a flow chart of an example method 400 for controlling current to certain components of a wireless communication device (e.g., wireless communication device 200), in accordance with embodiments of the present disclosure. According to some embodiments, method 400 may begin at step 402. As noted above, teachings of the present disclosure may be implemented in a variety of configurations of system 100 and/or wireless communication device 200. As such, the preferred initialization point for method 300 and the order of the steps 402-424 comprising method 400 may depend on the implementation chosen.

At step 402, components of a wireless communication device may wait for a subsequent subframe or slot boundary for wireless communication signals. At step 404, at the subsequent subframe or slot boundary, a control module (e.g., control module 256) or another component of a wireless communication device may determine whether the wireless communication device is currently operating in a high-current mode. If operating in a high-current mode, method 400 may proceed to step 406. Otherwise, if operating in a low-current mode, method 400 may proceed to step 416.

At step 406, in response to a determination that wireless communication device is operating in a high-current mode, the control module or other component of wireless communication module may determine whether signal strength of a signal in a receive path of the wireless communication device is above a first threshold and whether any clipping of signals in an ADC of the receive path is occurring. If the signal strength is above the first threshold and no ADC clipping is occurring, method 400 may proceed to step 408. Otherwise, method 400 may proceed again to step 402.

At step 408, wireless communication element 200 may enter a low-current mode and the ADC and a decimation filter of the receive path may reduce their sampling rates to respective sampling rates lower than those applied during a high-current mode, and modify their operational parameters (e.g., coefficients) to account for the reduced current mode. At step 410, a gain and delay equalization filter may modify operational parameters to compensate for gain and/or delay variances between the high-current mode and the low-current mode of the ADC, decimation filter, and/or other components of wireless communication device 200. At step 412, gain elements (e.g., LNA 234) of the wireless communication device may reduce their bias levels and/or an oscillator of the wireless communication element may reduce the drive levels of itself or its generation buffers. At step 414, updates made to the gain or variable gain elements of the receive path (e.g., LNA 234) may be made based on operation in the low-current state. After completion of step 414, method 400 may proceed again to step 402.

At step 416, in response to a determination that wireless communication device is operating in a low-current mode, the control module or other component of wireless communication module may determine whether signal strength of a signal in a receive path of the wireless communication device is below a second threshold or whether any clipping of signals in an ADC of the receive path is occurring. If the signal strength is below the second threshold or ADC clipping is occurring, method 400 may proceed to step 418. Otherwise, method 400 may proceed again to step 402.

At step 418, wireless communication element 200 may enter a high-current mode and the ADC and a decimation filter of the receive path may increase their sampling rates to respective sampling rates higher than those applied during a low-current mode, and modify their operational parameters (e.g., coefficients) to account for the increased current mode. At step 420, a gain and delay equalization filter may modify operational parameters to compensate for gain and/or delay variances between the high-current mode and the low-current mode of the ADC, decimation filter, and/or other components of wireless communication device 200. At step 422, gain elements (e.g., LNA 234) of the wireless communication device may increase their bias levels and/or an oscillator of the wireless communication element may increase the drive levels of itself or its generation buffers. At step 424, updates made to the gain or variable gain elements of the receive path (e.g., LNA 234) may be made based on operation in the high-current state. After completion of step 424, method 400 may proceed again to step 402.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order. Method 400 or steps similar to method 400 may be applied to either of an increase or a decrease in aggregate available bandwidth.

Method 400 may be implemented using wireless communication device 200 or any other system operable to implement method 400. In certain embodiments, method 400 may be implemented partially or fully in software and/or firmware embodied in a memory or other computer-readable media and executable by a processor or other suitable device.

Although significant discussion above provides details of operation in a low-power mode and a high-power mode of wireless communication device, it is noted that in some embodiments, wireless communication device 200 may, consistent with this disclosure, include operation in three or more current modes. In such embodiments, control module 256 may be configured to select among the three or more current modes and output a signal indicative of such selected mode, and one or more components of wireless communication device 200 may be configured to modify their operational parameters in accordance with the selected current mode.

Certain components of wireless communication device 200 may be implemented in whole or part as or a part of one or more microprocessors, digital signal processors, and/or other suitable devices.

A component of network wireless communication device 200 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to wireless communication device 200 from the scope of the disclosure. The components of wireless communication device 200 may be integrated or separated. Moreover, the operations of wireless communication device may be performed by more, fewer, or other components. As used in this document, "each" refers to each member of a set or each member of a subset of a set.

Although the present disclosure has been described with several embodiments, various changes and modifications may be suggested to one skilled in the art. It is intended that the present disclosure encompass such changes and modifications as fall within the scope of the appended claims.

What is claimed is:

1. A wireless communication receiver, comprising:
    a receive path configured to receive a wireless communication signal and convert the wireless communication signal into a digital signal based at least on an oscillator signal, the receive path comprising hardware including a downconverter, an analog-to-digital converter and an equalization filter located after the analog-to-digital converter in the receive path;
    a control path communicatively coupled to the receive path and configured to: determine a signal strength of a signal in the receive path;
    based at least on the signal strength, select a current mode from at least one of a first current mode and a second current mode for the wireless communication receiver, wherein the receive path has a first receive path gain and a first receive path delay in the first current mode and has a second receive path gain and a second receive path delay in the second current mode; and
    communicate a control signal to the receive path indicative of the current mode;
    the receive path configured to:
    in response to the switch from the first current mode to the second current mode as indicated by the control signal, modify one or more operational parameters of the receive path such that the receive path consumes a lower amount of current than it does in the first current mode; and
    in response to the switch from the second current mode to the first current mode as indicated by the control signal, modify one or more operational parameters of the receive path such that the receive path consumes a higher amount of current than it does in the second current mode; and
    the equalization filter configured to, in response to a switch from the first current mode to the second current mode or a switch from the second current mode to the first current mode, modify a gain and a delay of the equalization filter to compensate for a gain difference between the first receive path gain associated with the first current mode and the second receive path gain associated with the second current mode, and to compensate for a delay difference between the first receive path delay associated with the first current mode and the second receive path delay associated with the second current mode.

2. The wireless communication receiver according to claim 1, wherein modifying one or more operational parameters comprises modifying a bias current of one or more gain elements of the receive path.

3. The wireless communication receiver according to claim 1, wherein modifying one or more operational parameters comprises modifying at least one of: a sampling rate of the analog-to-digital converter of the receive path, a coefficient of at least one feedback element of the analog-to-digital converter, and a gain element of the analog-to-digital converter.

4. The wireless communication receiver according to claim 3, wherein modifying one or more operational parameters does not comprise modifying a topology of the analog-to-digital converter or modifying an order of the analog-to-digital converter.

5. The wireless communication receiver according to Claim 1, wherein modifying one or more operational parameters comprises modifying at least one of: a sampling rate of a decimation filter of the receive path, a downsampling ratio of the decimation filter, and a coefficient of the decimation filter.

6. The wireless communication receiver according to claim 1, the control path configured to select the first current mode if the signal strength is below a threshold signal strength.

7. The wireless communication receiver according to claim 1, the control path configured to select the second current mode if the signal strength is above a threshold signal strength.

8. The wireless communication receiver according to claim 1, wherein:
the analog-to-digital converter includes:
a plurality of integrators; and
a plurality of comparators, each of the plurality of comparators configured to compare an output of a respective integrator to a threshold to determine whether clipping is present at the output of the respective integrator; and
the control path is configured to select the current mode based further on whether clipping is present at one or more integrator outputs within the analog-to-digital converter.

9. A method comprising:
determining a signal strength of a signal in a receive path including an analog-to-digital converter and an equalization filter located after the analog-to-digital converter, of a wireless communication receiver, the receive path configured to receive a wireless communication signal and convert the wireless communication signal into a digital signal based at least on an oscillator signal;
based at least on the signal strength selecting a current mode from at least one of a first current mode and a second current mode for the wireless communication receiver;
communicating a control signal to the receive path indicative of the current mode; in response to the switch from the first current mode to the second current mode as indicated by the control signal, modifying one or more operational parameters of the receive path such that the receive path consumes a lower amount of current than it does in the first current mode;
in response to the switch from the second current mode to the first current mode as indicated by the control signal modifying one or more operational parameters of the receive path such that the receive path consumes a higher amount of current than it does in the second current mode;
wherein the receive path has a first receive path gain and a first receive path delay in the first current mode, and has a second receive path gain and a second receive path delay in the second current mode; and
in response to a switch from the first current mode to the second current mode or a switch from the second current mode to the first current mode, modifying a gain and a delay of the equalization filter associated with the receive path to compensate for a gain difference between the first receive path gain associated with the first current mode and the second receive path gain associated with the second current mode and to compensate for a delay difference between the first receive path delay associated with the first current mode and the second receive path delay associated with the second current mode.

10. A method according to claim 9, wherein modifying one or more operational parameters comprises modifying a bias current of one or more gain elements of the receive path.

11. The method according to claim 9, wherein modifying one or more operational parameters comprises modifying at least one of: a sampling rate of the analog-to-digital converter of the receive path, a coefficient of at least one feedback element of the analog-to-digital converter, and a gain element of the analog-to-digital converter.

12. The method according to claim 11, wherein modifying one or more operational parameters does not comprise modifying a topology of the analog-to-digital converter or modifying an order of the analog-to-digital converter.

13. The method according to claim 9, wherein modifying one or more operational parameters comprises modifying at least one of: a sampling rate of a decimation filter of the receive path, a downsampling ratio of the decimation filter, and a coefficient of the decimation filter.

14. The method according to claim 9, further comprising selecting the first current mode if the signal strength is below a threshold signal strength.

15. The method according to claim 9, further comprising selecting the second current mode if the signal strength is above a threshold signal strength.

16. The method according to claim 9, further comprising:
comparing each of a plurality of integrator outputs within the analog-to-digital converter of the receive path to a threshold to determine whether clipping is present at one or more of the plurality of integrator outputs of the analog-to-digital converter; and
selecting the current mode based further on whether clipping is present at one or more of the plurality integrator outputs within the analog-to-digital converter.

* * * * *